US010625449B2

(12) United States Patent
Wetz et al.

(10) Patent No.: US 10,625,449 B2
(45) Date of Patent: Apr. 21, 2020

(54) BELT PULLEY AND PLASTIC INJECTION-MOLDING METHOD FOR THE PRODUCTION THEREOF

(71) Applicant: Schaeffler Technologies AG & Co. KG, Herzogenaurach (DE)

(72) Inventors: Bernd Wetz, Oberscheinfeld (DE); Katrin Diller, Weisendorf (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 359 days.

(21) Appl. No.: 15/505,732

(22) PCT Filed: Aug. 4, 2015

(86) PCT No.: PCT/DE2015/200434
§ 371 (c)(1),
(2) Date: Feb. 22, 2017

(87) PCT Pub. No.: WO2016/034175
PCT Pub. Date: Mar. 10, 2016

(65) Prior Publication Data
US 2017/0259475 A1 Sep. 14, 2017

(30) Foreign Application Priority Data

Sep. 2, 2014 (DE) ........................ 10 2014 217 491

(51) Int. Cl.
| B29C 45/33 | (2006.01) |
| B29C 45/00 | (2006.01) |
| B29C 45/34 | (2006.01) |
| F16H 55/48 | (2006.01) |
| F16H 55/49 | (2006.01) |

(Continued)

(52) U.S. Cl.
CPC .......... *B29C 45/0046* (2013.01); *B29C 45/33* (2013.01); *B29C 45/34* (2013.01); *F16H 55/48* (2013.01); *F16H 55/49* (2013.01); *B29L 2031/322* (2013.01); *B29L 2031/7498* (2013.01)

(58) Field of Classification Search
None
See application file for complete search history.

(56) References Cited

U.S. PATENT DOCUMENTS

| 8,617,016 B2 | 12/2013 | Dutil et al. |
| 2010/0052412 A1 | 3/2010 | Morris |
| 2010/0184548 A1 | 7/2010 | Langlois et al. |

FOREIGN PATENT DOCUMENTS

| EP | 2175169 | 4/2010 |
| JP | 2006264208 | 10/2006 |

*Primary Examiner* — Ryan M Ochylski
(74) *Attorney, Agent, or Firm* — Volpe and Koenig, P.C.

(57) ABSTRACT

Provided is a plastic injection-molding method for producing a poly-V belt pulley, which has an outer ring, an inner ring, and a ring web, which connects the outer ring to the inner ring and has a plurality of radially oriented ribs. The injection molding occurs in a circular-ring-shaped injection-molding cavity, a poly-V-ribbed inner shell of which is formed by a plurality of radially movable slides and which is vented during the injection molding by the gaps between the slides adjacent to each other. The rib contour in the injection-molding cavity are designed in such a way that the plurality of ribs is formed of a first group of thin ribs and a second group of thick ribs and that the gaps extend in radial extension of the thin ribs, the width of which is significantly less than the width of the thick ribs, which extend circumferentially between the gaps.

7 Claims, 2 Drawing Sheets

(51) Int. Cl.
*B29L 31/32* (2006.01)
*B29L 31/00* (2006.01)

BELT PULLEY AND PLASTIC INJECTION-MOLDING METHOD FOR THE PRODUCTION THEREOF

BACKGROUND

The invention relates to a plastic injection-molding method for the production of a poly-V belt pulley and a belt pulley produced according to this method. This has an outer ring, an inner ring, and a ring web connecting the outer ring to the inner ring with a plurality of radially oriented ribs for supporting the outer ring against the inner ring. The injection molding is performed in a cylindrical injection-molding cavity whose poly-V ribbed inner shell is formed by a plurality of radially moveable slides and is ventilated during the injection molding via the gaps between the adjacent slides.

Such belt pulleys are typically used in belt drives of internal combustion engines for tensioning or guiding a poly-V belt (also called V-ribbed belt). The production is performed through plastic extrusion coating of the outer ring of a ball bearing that holds the belt pulley in a rotating manner on the internal combustion engine—see, for example, U.S. Pat. No. 8,617,016 B2. The removability of the poly-V ribbed running casing of the belt pulley from the injection-molding tool requires radially moveable slides that form, in the closed state, the correspondingly ribbed inner shell of the injection-molding cavity.

The ventilation of the cavity required for the extrusion coating is performed through the gaps between the slides. For the dimensioning of the gaps, however, the following target conflict results: a small gap causes the risk of air inclusions in the cavity, especially in the area of its axial end sides and circumferentially between the gaps and consequently of burn marks that reduce the tool service life. This risk increases with the width of the belt pulley and leads to unacceptable tool wear especially for PK5, PK6, and wider rib profiles. Increasing the gap promotes ventilation but negatively affects the roundness of the ribbed belt pulley running casing due to the high material accumulation on the gap with correspondingly impermissible burr formation.

SUMMARY

The invention is based on the objective of providing a plastic injection-molding method that is improved with respect to the filling behavior and the ventilation of the injection-molding cavity for producing a poly-V belt pulley of the type specified above.

The object is achieved through the use of one or more of the features of the method according to the invention. Accordingly, the ribbed contour in the injection-molding cavity should be constructed such that the plurality of ribs is formed of a first group of thin ribs and a second group of thick ribs and the gaps run in radial extension of the thin ribs whose width is significantly smaller than the width of the thick ribs that run circumferentially between the gaps. The relatively small width of the thin ribs that are radially aligned with the gaps prevents the formation of disadvantageous air inclusions in the areas of the injection-molding cavity running circumferentially between the gaps. Instead, these areas are filled up primarily with the plastic melt that forces the air located there in the direction of the gaps. An enlargement of the gap promoting the undesired burr formation on the running casing of the belt pulley thus can be eliminated.

The filling behavior of the injection-molding cavity that is improved in this way and significantly mitigates the target conflict explained above was confirmed by a mold-flow analysis. Here, the following parameters have also proven to be preferred constructions of the invention or a belt pulley produced according to the method according to the invention:

For end-side injection of the injection-molding cavity, the number of injection points and the number of slides should be identical. In particular, for the number i of injection points and the number s of slides, the following should apply: i=s=9 or i=s=11. The number r of ribs should be an odd number and should equal three times the number of slides, thus, r=27 or r=33. In this case, the injection points are each positioned between two relatively wide thick ribs, i.e., in the circumferentially center area of the slides. The ribs should be dimensioned so that the width w1 of the thin ribs aligned with the gaps is at most 80% of the width w2 of the thick ribs running in-between: w1/w2<0.8.

BRIEF DESCRIPTION OF THE DRAWINGS

Other features of the invention are given from the following description and from the drawings in which a belt pulley produced according to the method according to the invention is shown for an auxiliary unit belt drive of an internal combustion engine. Shown are.

DETAILED DESCRIPTION OF THE PREFERRED EMBODIMENTS

Figure 1:
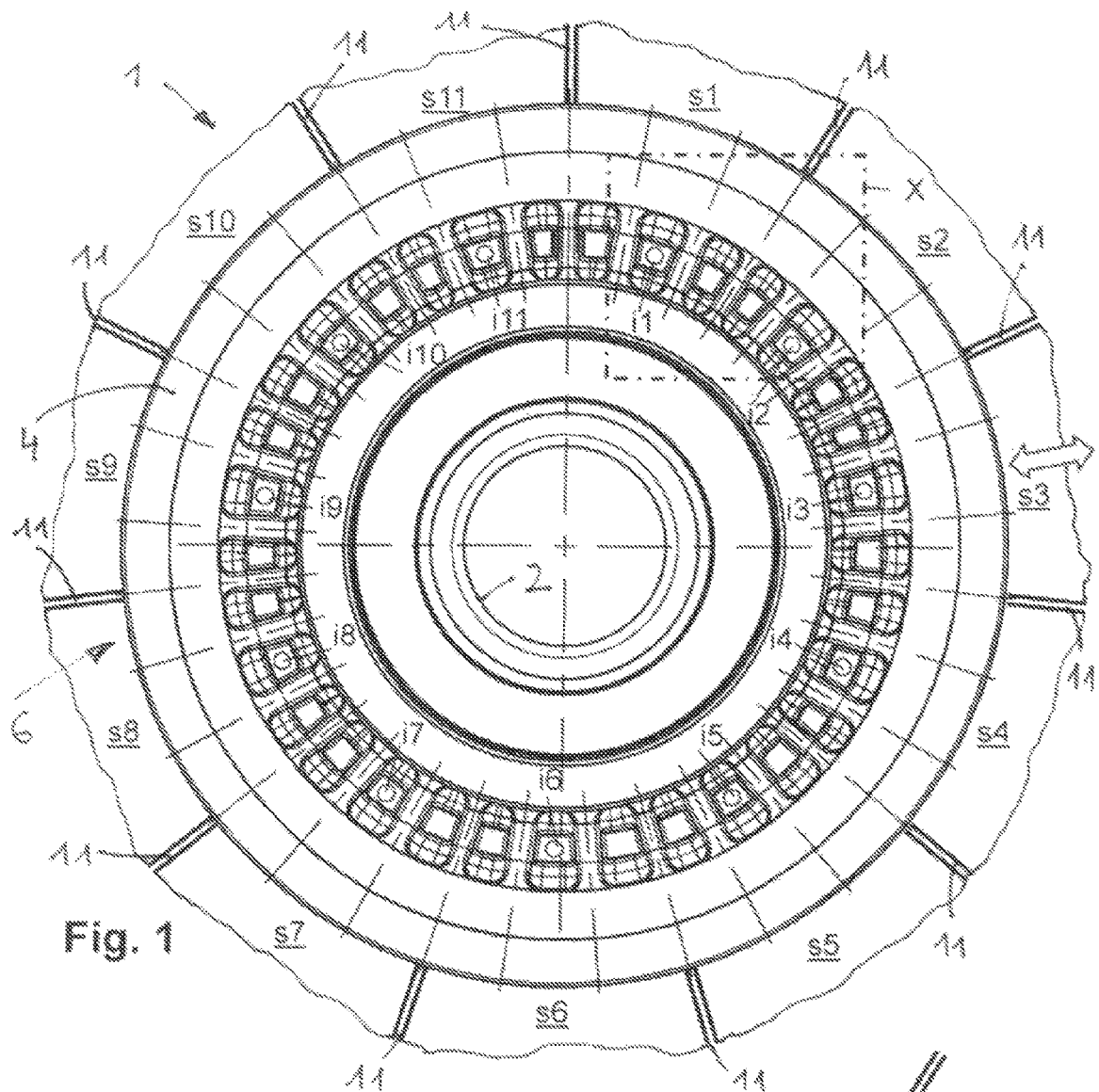
FIG. 1 the belt pulley in a top view in connection with the greatly schematized injection-molding tool.
Figure 3:
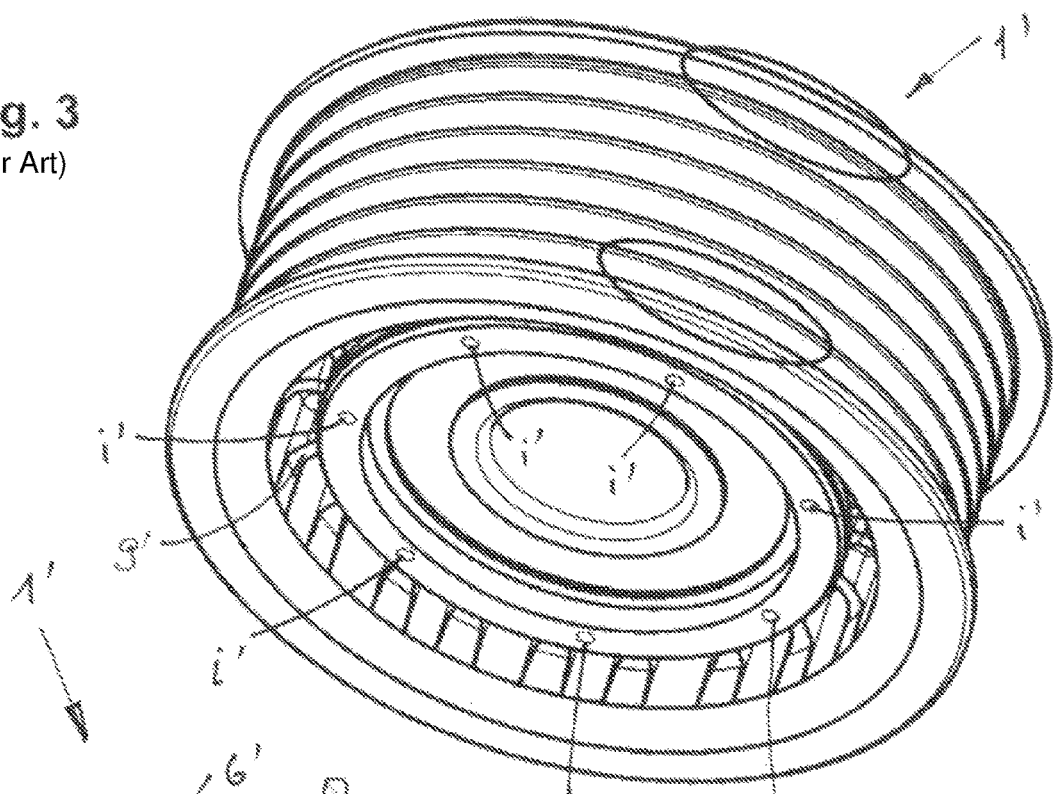
FIG. 3 a known belt pulley in perspective view.
Figure 4:
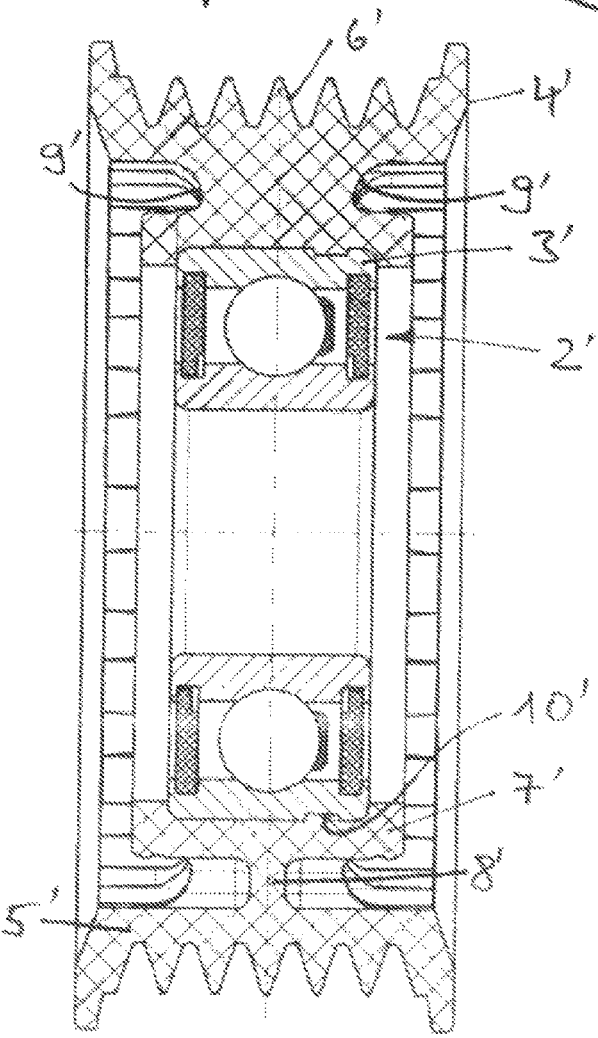
FIG. 4 the known belt pulley in longitudinal section.

The belt pulley 1' shown in FIGS. 3 and 4 illustrates the basic design of the belt pulley 1 that is produced according to the invention and is shown in FIG. 1 only in the top view that is essential for the understanding of the invention. The known belt pulley 1' consists of a single-row ball bearing 2' that is sealed on two sides and whose bearing outer ring 3' is molded with a running slide 4' formed of plastic for engagement with a poly-V belt. This takes place on the end side of the belt pulley 1' as can be seen with reference to the associated injection points i'.

The running slide 4' formed of polyamide PA66 with 25% glass-fiber reinforcement is assembled geometrically from an outer ring 5' with the running casing 6' here as a PK6 poly-V ribbed casing, an inner ring 7', a ring web 8' connecting the two rings 5' and 7', and a plurality of radially oriented ribs 9' that are formed on both sides of the ring web 8' and support the outer ring 5' against the inner ring 7'. The inner ring 7' encloses the bearing outer ring 3' on its cylindrical casing surface and grips in a known way in a circumferential, knurled groove 10'.

Figure 2:
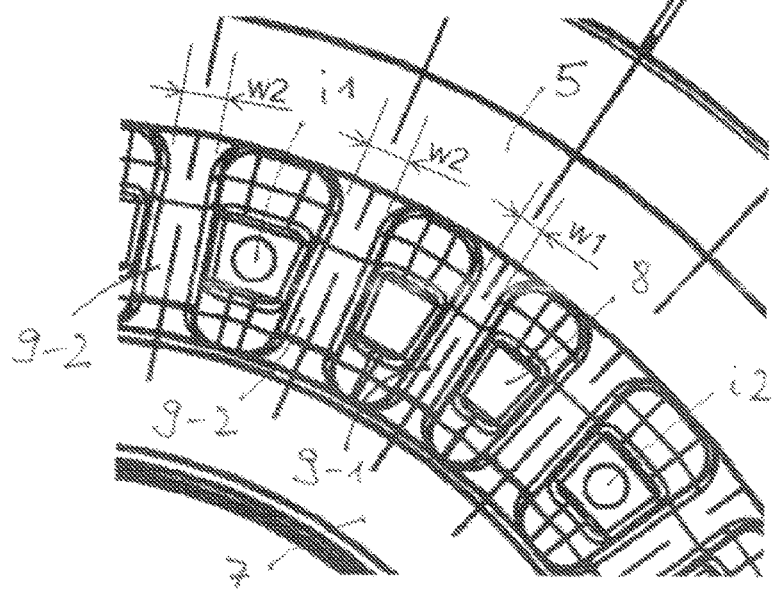
FIG. 2 the detail X from FIG. 1.

The plastic injection molding according to the invention for the ball bearing 2 for producing the belt pulley 1 shown in FIGS. 1 and 2 takes place in an injection-molding tool with a circular-ring-shaped injection-molding cavity corresponding to the running slide 4, whose poly-V-ribbed inner shell is formed by a plurality s of slides s1 to s11 distributed equally around the circumference. As indicated by the arrow for slide s3, the slides s1 to s11 can move radially for the purpose of removability of the corresponding poly-V-ribbed running jacket 6, wherein the injection-molding cavity is closed for inserted slides s1 to s11 and is ventilated during the filling process via the gaps 11 between the adjacent slides s1 to s11. Through the formation of the injection-molding cavity explained below, this ventilation is performed as completely as possible so that air inclusions are prevented both in the tool and also in the workpiece. As mentioned above, such air inclusions in known injection-molding methods typically occur in the areas circled at the top in FIG. 3 in the circumferential area of the slides.

The injection of the plastic into the injection-molding cavity is performed on the end side by a distributor with a plurality i of injection points i1 to i11, which is identical to the plurality s of slides s1 to s11, i.e., i=s=11. The plurality r of ribs 9 that are oriented radially for the purpose of reduced noise development of the rotating belt pulley 1 with unequal angle distribution is an odd number and is equal to three times the value, i.e., r=33. The rib contour in the injection-molding cavity is constructed so that, for one, the ribs 9 shaped therein, are formed of a first group of thin ribs 9-1 and from a second group of thick ribs 9-2. Here, the width of the thin ribs 9-1 with w1=1.5 mm is significantly smaller than the width of the thick ribs 9-2 with w2=2 mm, i.e., the radio w1/w2=0.75. On the other hand, in the circumferential sequence, exactly every third rib is one of the thin ribs 9-1 in whose radial extension (outward) the gaps 11 run. The thick ribs 9-2 run circumferentially between the gaps 11.

The injection points i1 to i11 are each positioned between two directly adjacent, thick ribs 9-2 on the ring web 8 that connects the outer ring 5 to the inner ring 7. As is the case for the known belt pulley according to FIG. 3, the injection points can alternatively also be positioned on the inner ring 7 for unchanged circumferential angles.

The invention claimed is:

1. A plastic injection-molding method for producing a poly-V belt pulley that has an outer ring, an inner ring, and a ring web connecting the outer ring to the inner ring with a plurality (r) of radially oriented ribs for supporting the outer ring against the inner ring, the method comprising performing the injection molding in a circular ring-shaped injection-molding cavity having a poly-V ribbed inner shell that is formed by a plurality (s) of radially moveable slides and is ventilated during the injection molding process via gaps between adjacent ones of the slides, forming a rib contour in the injection-molding cavity such that the plurality (r) of the ribs is formed of a first group of thin ribs and a second group of thick ribs and the gaps run in radial extension of the thin ribs which have a width (w1) that is smaller than a width (w2) of the thick ribs that run circumferentially between the gaps.

2. The plastic injection-molding method according to claim 1, further comprising performing an end-side injection molding of the injection-molding cavity via a distributor with a plurality (i) of injection-molding points, wherein for the plurality (i) of injection-molding points and the plurality (s) of slides the following applies: i=s.

3. The plastic injection-molding method according to claim 2, wherein for the plurality (r) of ribs and the plurality (s) of slides the following applies: r=3s, and the injection-molding points are each positioned between two directly adjacent ones of the thick ribs.

4. The plastic injection-molding method according to claim 3, wherein for the plurality (i) of injection-molding points, the following applies: i=9 or i=11.

5. The method according to claim 1, wherein for the width (w1) of thin ribs and the width (w2) of thick ribs, the following applies: w1/w2<0.8.

6. The method according to claim 5, wherein the plurality (r) of ribs is an odd number.

7. The method according to claim 6, wherein for the plurality (r) of ribs the following applies: r=27 or r=33, and exactly every third rib is one of the thin ribs.

* * * * *